(12) United States Patent
Bostick et al.

(10) Patent No.: US 11,119,562 B2
(45) Date of Patent: *Sep. 14, 2021

(54) POWER SHARING AMONG USER DEVICES

(71) Applicant: INTERNATIONAL BUSINESS MACHINES CORPORATION, Armonk, NY (US)

(72) Inventors: James E. Bostick, Cedar Park, TX (US); John M. Ganci, Jr., Raleigh, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 258 days.

This patent is subject to a terminal disclaimer.

(21) Appl. No.: 16/394,081

(22) Filed: Apr. 25, 2019

(65) Prior Publication Data
US 2019/0250696 A1  Aug. 15, 2019

Related U.S. Application Data

(63) Continuation of application No. 14/826,440, filed on Aug. 14, 2015, now Pat. No. 10,310,591.

(51) Int. Cl.
*G06F 1/32* (2019.01)
*G06F 1/3296* (2019.01)
(Continued)

(52) U.S. Cl.
CPC .............. *G06F 1/3296* (2013.01); *G06F 1/32* (2013.01); *G06F 1/3209* (2013.01); *G06F 1/329* (2013.01);
(Continued)

(58) Field of Classification Search
CPC ........ G06F 1/3296; G06F 1/32; G06F 1/3209; G06F 1/3287; G06F 1/329; G06Q 10/06; G06Q 50/06; H04W 52/0277; Y02D 30/70
See application file for complete search history.

(56) References Cited

U.S. PATENT DOCUMENTS

| 5,483,656 A | 1/1996 | Oprescu et al. |
| 7,750,498 B2 | 6/2010 | Wight et al. |
| (Continued) |

FOREIGN PATENT DOCUMENTS

WO  2009070171 A1  6/2009

OTHER PUBLICATIONS

Eberhard Waffenschmidt, "Wireless Power for Mobile Devices", Philips Research Europe Eindhoven, The Netherlands, Oct. 9-13, 2011, 9 pages.

(Continued)

*Primary Examiner* — Zahid Choudhury
(74) *Attorney, Agent, or Firm* — Brian Restauro; Andrew M. Calderon; Roberts Calderon Safran & Cole, P.C.

(57) ABSTRACT

A method comprises receiving, by a computing device, a desired usage plan for a plurality of user devices associated with a group of users; determining, by the computing device, whether an amount of power available across the plurality of user devices is sufficient to implement the desired usage plan; generating, by the computing device and based on the amount of power available across the plurality of user devices for the desired usage rules, usage rules that allocate the usage of the plurality of the user devices by each user in the group of users; and outputting to the plurality of user devices, the usage rules to cause the plurality of user devices to limit the usage of the plurality of user devices by each user in the group of users based on the allocation.

17 Claims, 14 Drawing Sheets

(51) Int. Cl.
  *G06F 1/3209* (2019.01)
  *G06F 1/3287* (2019.01)
  *G06F 1/329* (2019.01)
  *H04W 52/02* (2009.01)
  *G06Q 10/06* (2012.01)
  *G06Q 50/06* (2012.01)

(52) U.S. Cl.
  CPC ........... *G06F 1/3287* (2013.01); *G06Q 10/06* (2013.01); *G06Q 50/06* (2013.01); *H04W 52/0277* (2013.01); *Y02D 10/00* (2018.01); *Y02D 30/70* (2020.08)

(56) References Cited

U.S. PATENT DOCUMENTS

| | | | |
|---|---|---|---|
| 7,791,311 | B2 | 9/2010 | Sagoo |
| 8,037,329 | B2* | 10/2011 | Leech .................... G06F 9/505 |
| | | | 713/320 |
| 8,271,806 | B1 | 9/2012 | Xiao et al. |
| 8,655,307 | B1 | 2/2014 | Walker et al. |
| 8,768,419 | B2 | 7/2014 | Sivaraman et al. |
| 8,805,457 | B2 | 8/2014 | Sarker |
| 9,692,259 | B2 | 6/2017 | Boss et al. |
| 2007/0130481 | A1 | 6/2007 | Takahashi et al. |
| 2011/0016333 | A1 | 1/2011 | Scott et al. |
| 2011/0258467 | A1 | 10/2011 | Antoci |
| 2011/0320828 | A1 | 12/2011 | Boss et al. |
| 2011/0320832 | A1 | 12/2011 | Boss et al. |
| 2012/0016528 | A1 | 1/2012 | Raman et al. |
| 2013/0124885 | A1 | 5/2013 | Davis et al. |
| 2014/0122656 | A1 | 5/2014 | Baldwin et al. |
| 2014/0280990 | A1 | 9/2014 | Dove et al. |
| 2015/0019889 | A1 | 1/2015 | Banerjee et al. |
| 2015/0042264 | A1 | 2/2015 | Leabman et al. |
| 2015/0050963 | A1 | 2/2015 | Rokusek et al. |
| 2015/0323981 | A1* | 11/2015 | Yarvis ............... H04W 52/0277 |
| | | | 713/323 |
| 2017/0045932 | A1 | 2/2017 | Bostick et al. |

OTHER PUBLICATIONS

List of IBM Patents or Patent Applications Treated as Related, Apr. 23, 2019, 1 page.

* cited by examiner

Power Planning Platform

Your total power availability across all of your devices is Z units
Please input your desired application usage for each user

User A
Power distribution: 40%
E-mail: 1 hour
Video viewing: 30 min
Social media: 2 hr
Texting: 45 min
Voice Calling: 1 hour

User B
Power distribution: 35%
E-mail: 2 hour
Camera: 20 min
Social media: 3 hr
Texting: 35 min
Video Calling: 30 min

User C
Power distribution: 15%
Video viewing : 2 hour
Game 1: 30 min
Game 2: 45 min

User D
Power distribution: 10%
Game 1: 50 min
Game 3: 20 min

Submit 

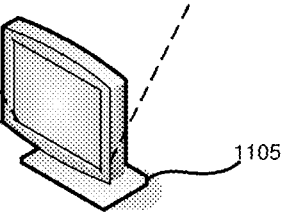

Power Planning Component 205

POWER SHARING AMONG USER DEVICES

TECHNICAL FIELD

The present invention generally relates to user device power management, and more particularly, to power sharing among user devices associated with a group of specific users.

BACKGROUND

When traveling in a group, families or team members often carry multiple user devices, e.g., tablets, smart phones, media players, etc. Battery charging receptacles for these user devices are not always readily available when traveling, and as a result, battery power is often drained from the user devices before users have the opportunity to fully utilize their user devices. For example, one user may consume battery power on the user devices before another user has the opportunity to utilize their user devices before battery power has been consumed.

Existing systems do not proactively plan usage of user devices when battery charging facilities are not available for an extended period of time, e.g., when traveling. As a result, users are often left unable to perform desired tasks before battery power on their user devices run out. Accordingly, proactive planning of user device usage can help to ensure that users in a group are able to perform desired tasks before battery power on their user devices run out.

SUMMARY

In an aspect of the invention, method comprises receiving, by a computing device, a desired usage plan for a plurality of user devices associated with a group of users; determining, by the computing device, whether an amount of power available across the plurality of user devices is sufficient to implement the desired usage plan; generating, by the computing device and based on the amount of power available across the plurality of user devices for the desired usage rules, usage rules that allocate the usage of the plurality of the user devices by each user in the group of users; and outputting to the plurality of user devices, the usage rules to cause the plurality of user devices to limit the usage of the plurality of user devices by each user in the group of users based on the allocation. The method may suggest an alternate usage plan based on determining that the amount of power available across the plurality of user devices is not sufficient to implement the desired usage plan. Advantageously, the method proactively determines whether a desired usage plan is possible, e.g., based on an amount of power available across a group of user devices. Also, the method limits usage of the user devices by individual users so that the usage plan can be implemented, e.g., so that each user can consume a particular amount or share of power that is available across all the user devices without the need to recharge the user devices. If the desired usage plan is not possible, e.g., if the desired usage plan consumes more power than what is available across all of the user devices, the method may suggest an alternate usage plan. In accordance with aspects of the invention, the method analyzes power consumption data, e.g., rates at which different applications consume power, and based on the power consumption data, the method may determine whether a desired usage plan consumes greater than the amount of total available power across user devices.

In another of the invention, there is a computer program product for sharing battery power across a plurality of user devices associated with a group of users. The computer program product includes a computer usable storage medium having program code embodied in the storage medium. The program code is readable/executable by a computing device to receive a desired usage plan for the plurality of user devices; determine whether an amount of power available across the plurality of user devices is sufficient to implement the desired usage plan; generate, based on the desired usage plan, usage rules that limit the usage of the plurality of the user devices by each user in the group of users; and output, to the plurality of user devices, the usage rules to cause the plurality of user devices to limit the usage of the plurality of user devices by each user in the group of users. The program instructions may further cause the computing device to: suggest an alternate usage plan based on determining that the amount of power available across the plurality of user devices is not sufficient to implement the desired usage plan. The generating of the usage rules is based on either the desired usage plan or the suggested usage plan. Advantageously, the computer program product divides power across a plurality of user devices among a group of individuals so that consumption of power on the user devices by each user is limited to their respective power allotments. This ensures that sufficient power is available for each user to use and enjoy their user devices in accordance with the usage plan, and without the need to recharge the user devices from a power source in a facility.

In a further aspect of the invention, system that includes a CPU, a computer readable memory and a computer readable storage medium associated with a user device. Additionally, the system includes one or more program instructions. The program instructions are operable to receive information identifying a user of a group of users; obtain a power consumption allocation associated with the user device of the user; obtain information identifying an amount of power that the user has consumed across a plurality of user devices associated with the user; determine whether the amount of power that the user has consumed across a plurality of user devices is less than the power consumption limit; block access to the user device when the amount of power that the user has consumed across a plurality of user devices is greater than the power consumption limit; and permit access to the user device when the amount of power that the user has consumed across a plurality of user devices is less than the power consumption limit. The system may further include program instructions to track an amount of power consumed by the user on the user device after permitting access to the user device; output information identifying the amount of power consumed by the user on the user device as the user uses the user device; and block the user's access to the user device when the power consumption limit has been reached. The program instructions are stored on the computer readable storage medium for execution by the CPU via the computer readable memory. Advantageously, the user device blocks user access when the user has consumed their allotted amount of power across a group of user devices so that sufficient power remains for other users to use the user devices.

BRIEF DESCRIPTION OF THE DRAWINGS

The present invention is described in the detailed description which follows, in reference to the noted plurality of drawings by way of non-limiting examples of exemplary embodiments of the present invention.

FIG. 9 shows an example user interface associated with a power planning component in accordance with aspects of the present invention.

DETAILED DESCRIPTION

Figure 1:
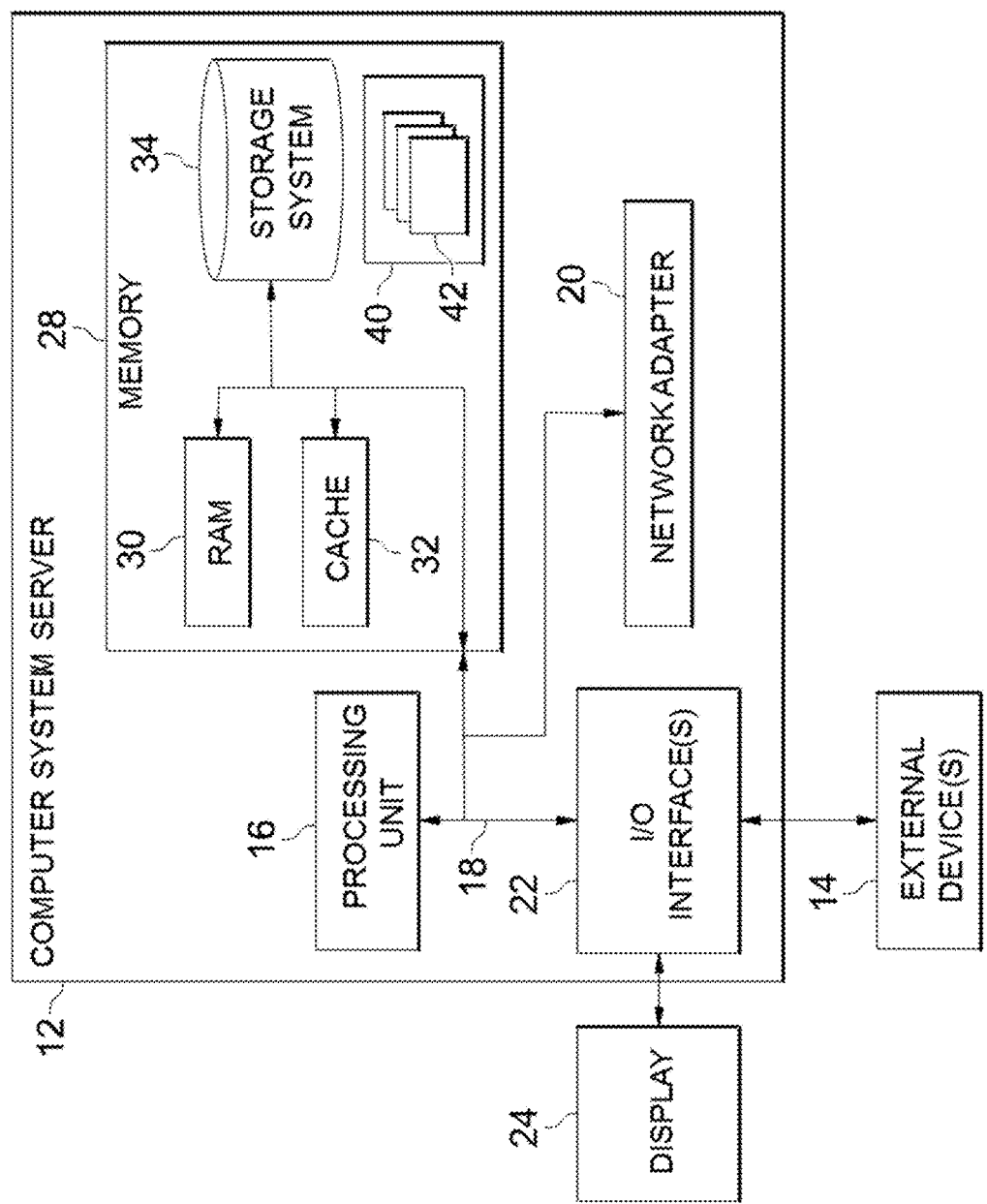
FIG. 1 depicts a cloud computing node according to an embodiment of the present invention.

The present invention generally relates to user device power management, and more particularly, to power sharing among user devices associated with a group of specific users. In accordance with aspects of the present invention, a predictive power usage plan can be generated based on the desired usage of user devices owned by a group e.g., a family, team members, etc. The desired usage may be, for example, durations that each member in the group wishes to use particular applications of the user devices without needing to recharge the user devices. In accordance with aspects of the invention, the power consumption data, e.g., rates at which different applications consume power, can also be analyzed to determine whether a desired usage plan consumes greater than the amount of total available power across user devices. If the desired usage plan consumes greater than the total available power, the power consumption data can be used to suggest an alternate usage plan.

In accordance with aspects of the present invention, guidance can be provided on how to share or allocate power across the user devices to achieve and implement the planned usage without needing to recharge the user devices from a power receptacle, e.g., in a facility. Further, rules can be generated to permit individual members of the group to consume only an allocated amount of power across the user devices. As an example, for a group having four users, e.g., User A, User B, User C, and User D, a usage plan can be implemented to allocate 40% of the available battery power to User A, 35% to User B, 15% to User C, and 10% to User D. Additionally, or alternatively, the usage plan may permit users to use particular applications for a maximum amount of time so that the users' power allotments are not exceeded. Rules can be enforced on the user devices to prevent the users from exceeding the allocated power. As a result, battery power for a group of user devices owned by a group can be intelligently and proactively managed so that the desired usage of the user devices can be achieved without the need to recharge the user devices. This is particularly advantageous when traveling and when power charging facilities are not readily available.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
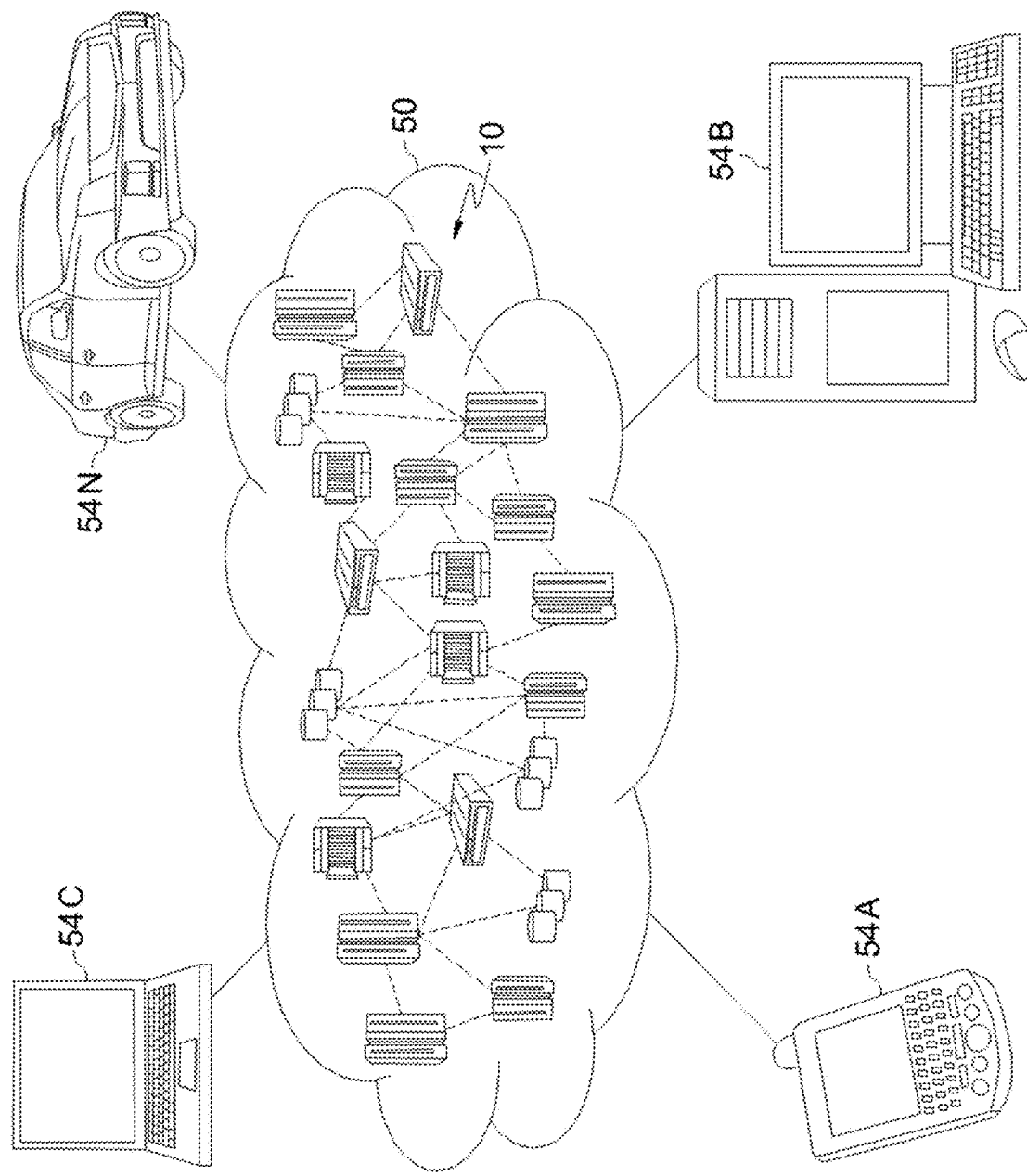
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
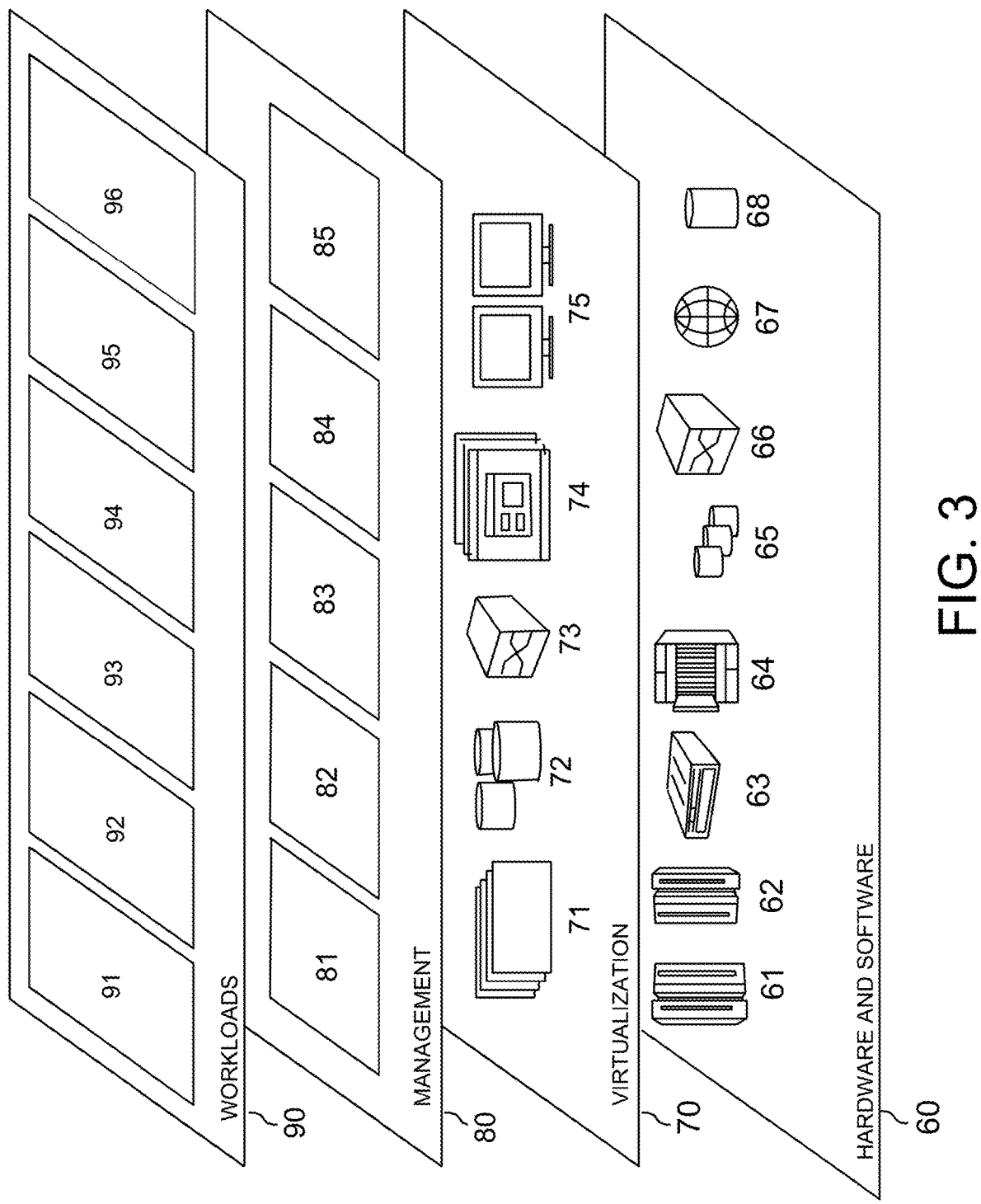
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and power planning 96.

Referring back to FIG. 1, the Program/utility 40 may include one or more program modules 42 that generally carry out the functions and/or methodologies of embodiments of the invention as described herein. Specifically, the program modules 42 may receive user inputs to register a group of user devices with a group of users or family, receive user inputs relating to desired usage for user devices without recharging the user devices, determine whether available power is available across the user devices for the desired usage plan, suggest alternative usage plans, generate usage rules based on a usage plan, and output the usage rules to the user devices. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a power planning component as shown in FIG. 4.

Figure 4:
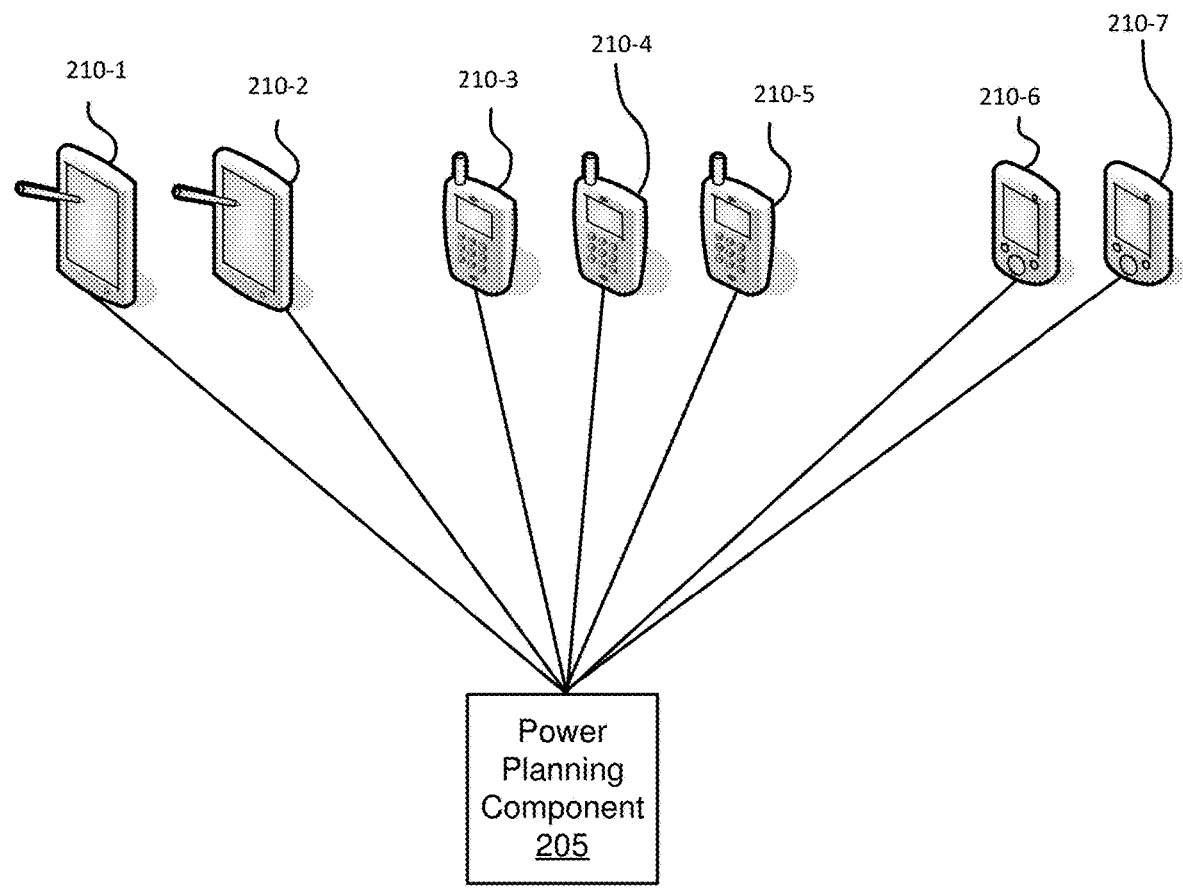
FIG. 4 shows an overview of an example implementation in accordance with aspects of the present invention

FIG. 4 shows an overview of an example implementation in accordance with aspects of the present invention. In FIG. 4, a power planning component 205 may receive information identifying a maximum power capacity for a group of user devices 210 registered to a group of users or family, e.g., user devices 210-1 through 210-7. The power planning component 205 may determine an aggregate maximum power capacity across all of the user devices 210-1 through 210-7, e.g., when all the user devices 210-1 through 210-7 are fully charged. By way of non-limiting illustrative example, the user device 210-1 may have a maximum capacity of X units of power, the user device 210-2 may have a maximum capacity of Y units of power, the user devices 210-3, 210-4, and 210-5 may each have a maximum capacity of P units of power, the user device 210-6 may have a maximum capacity of M units of power, and the user device 210-7 may have a maximum capacity of N unit of power. Given these assumptions, the power planning component 205 determines a total aggregate amount of maximum available power as (X+Y+3*P+M+N) units of power or Z units of power when all of the user devices 210-1 through 210-7 are fully charged. In embodiments, the units of power may be milliamp-hours or other unit of power.

The power planning component 205 may receive user inputs that indicate a desired usage of the user devices 210 for each member in the group. For example, the desired usage may indicate applications that users wish to use on the user devices 210, and the durations in which the users wish to use these applications. The power planning component 205 may determine the required amount of power to use the applications on the user devices 210 for the desired durations based on the rate at which different applications consume power. For example, a video player application may consume power at a higher rate than an e-mail application. The power planning component 205 may determine whether the desired usage is possible based on the aggregate amount of maximum available power and the required amount of power required for the desired usage. If the desired usage is possible, e.g., if the desired usage would consume equal to or less than the aggregate amount of maximum available power, the power planning component 205 may generate a usage plan that divides the aggregate available power to the users. As an example, a usage plan may identify that, for a particular group having four users, User A is allocated 40% of the aggregate amount of power, e.g., 40% of Z units of power, User B is allocated 35% of Z units of power, User C is allocated 15% of Z units of power, and User D is allocated 10% of Z units of power. If the desired usage is not possible, e.g., if the desired usage would consume greater than the aggregate amount of maximum available power, the power planning component 205 may generate a suggested usage plan that would consume equal to or less than the aggregate amount of maximum available power.

The power planning component 205 may generate rules or permissions that allow particular users to consume a particular amount of the aggregate power available across all of the user devices 210 registered to the group of users. Continuing with the above non-limiting illustrative example, the power planning component 205 may generate rules that permit User A to consume 40% of the aggregate power available across all of the user devices 210, e.g., 40% of Z units of power. The power planning component 205 may generate rules that permit User B to consume 35% of Z units of power, User C to consume 15% of Z units of power, and User D to consume 10% of Z units of power. As described herein, the user devices 210 may enforce these rules to prevent the users from exceeding their allotted power. Advantageously, aspects of the present invention manage the amount of power that each user consumes so that all users in the group are able to use the user devices 210 in accordance with a usage plan.

Figure 5:
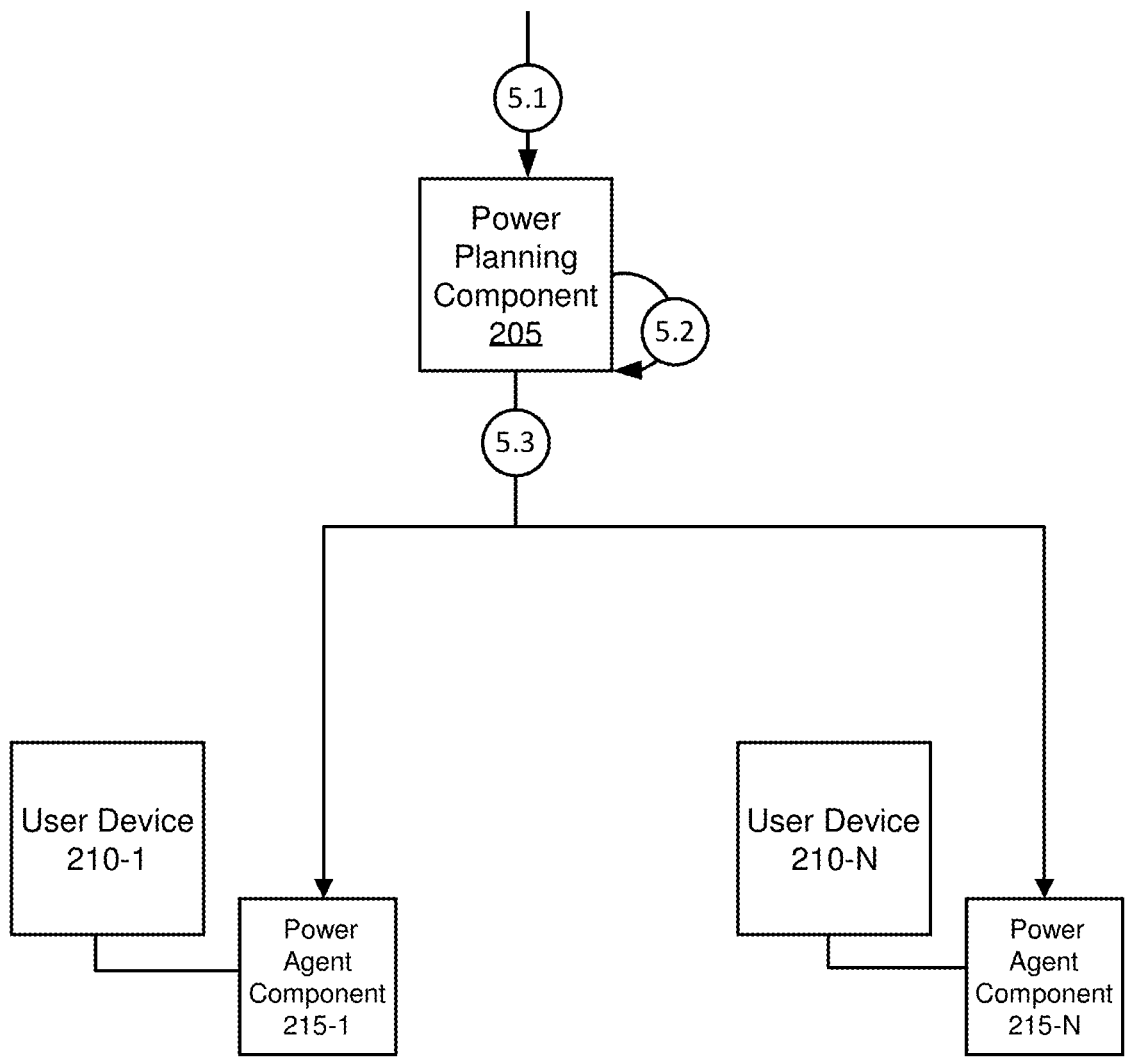
FIG. 5 shows an example block diagram for generating and outputting power consumption rules in accordance with aspects of the present invention.

FIG. 5 shows an example block diagram for generating and outputting power consumption rules in accordance with aspects of the present invention. As shown in FIG. 5, the power planning component 205 may receive user inputs (at arrow 5.1). In embodiments, the user inputs may indicate a desired usage plan for user devices 210-1 through 210-N. As an example, the user inputs may indicate that User A wishes to use an e-mail application for one hour, a video viewing application for 30 minutes, a social media application for two hours, a texting application for 45 minutes, and a voice calling application for one hour. In some embodiments, the user inputs may simply identify a portion of power to allocate to individual users. For example, the user inputs may indicate that User A should be allocated 40% of the total available power across user devices 210-1 through 210-N. Alternatively, the power planning component 205 may determine the amount of power to be allocated to particular users based on the desired usage plan. In embodiments, the power planning component 205 may receive the user inputs via a user interface, such as a web portal, or the like. Additionally, or alternatively, the power planning component 205 may receive the user inputs directly from a particular user device 210, e.g., a master or administrative user device 210.

Based on receiving the user inputs, the power planning component 205 may generate power consumption rules (at arrow 5.2) that permit the users in the group to consume a particular amount of power across all the user devices 210 registered to the group of users. Additionally, or alternatively, the rules may permit the users in the group to access certain applications for a particular amount of time in order for the users to stay within their allotted power amounts.

As further shown in FIG. 5, the rules are then output (at arrow 5.3) to the user devices 210-1 through 210-N. For example, each of the user devices 210-1 through 210-N may include a power agent component 215-1 through 215-N, respectively (hereinafter referred to as power agent component 215). The power agent component 215 may communicate with the power planning component 205 in order to receive the rules. For example, the power agent component 215 may communicate with the power planning component 205 periodically or intermittently. In embodiments, e.g., when the power planning component 205 is implemented in a cloud server, the power agent component 215 may communicate with the power planning component 205 when the user device 210 of the power agent component 215 connects to an external network, e.g., via a wired or wireless connection, such as a cellular connection, Wi-Fi connection, etc. In embodiments, e.g., when the power planning component 205 is implemented in a master user device 210, power agent component 215 may communicate with the power planning component 205 when a client user device 210 of the power agent component 215 is within communications range of the master user device 210, or when the client user device 210 and the master user device 210 are connected to the same local area network (LAN).

As described herein, the power planning component 205 may determine whether a desired usage plan is possible based on the total aggregate power available across all user devices 210 registered to a group of users or family. For example, the power planning component 205 may receive user inputs that indicate how the group of users in a family intends to use their user devices 210 without the need to recharge. For example, the user inputs may indicate that User A wishes to use an e-mail application for one hour, a video viewing application for 30 minutes, a social media application for two hours, a texting application for 45 minutes, and a voice calling application for one hour. The power planning component 205 may determine whether this usage plan is possible based on the rate of power that each application consumes, and based on the total aggregate amount of power across all of the user devices 210 registered to the group. If the desired usage plan is possible, the power planning component 205 may generate rules corresponding to the desired usage plan.

If the desired usage plan is not possible, e.g., if the desired usage would consume more than the aggregate amount of available power, the power planning component 205 may suggest an alternative usage plan that consumes power within the aggregate amount of available power. In some embodiments, the power planning component 205 may suggest an alternative usage plan when the power consumed for the desired usage is less than the aggregate amount of available power. For example, if the usage plan indicates that a user wishes to use an e-mail application for one hour, but enough power is available for the user to use the e-mail application for 1.5 hours, then the power planning component 205 may suggest an alternative usage plan of 1.5 hours for the e-mail application. In embodiments, a usage plan may be suggested based on usage history of user devices 210.

As described herein, the power agent component 215 may enforce the power consumption rules on an associated user device 210. For example, power agent component 215 may receive information identifying a user of user device 210, e.g., based on user login information, user biometrics information, and/or other information identifying the user of user device 210. As an example, the power agent component 215-1 may determine that User A is using user device 210-1 when User A logs in to the user device 210-1. Based on determining that User A is using user device 210-1, the power agent component 215-1 may enforce a power consumption rule for User A. As an illustrative example, assume that power agent component 215-1 receives a power consumption rule that permits User A to consume only 40% of the Z units of power, e.g., 40% of the total amount of aggregate power available across all the user devices 210 registered to the group of User A. Given this assumption, the power agent component 215-1 will only permit User A to consume only 40% of the Z units of power. For example, the power agent component 215-1 may track the amount of power that User A is using, and may provide this power usage information back to the power planning component 205. Once User A has reached his/her power allocation, power agent component 215-1 may lock user device 210-1 from being used by User A. For example, power agent component 215-1 may log User A out of user device 210-1, and may not permit User A to log back in. If User A attempts to log in from a different user device 210 registered to the group of User A, e.g., user device 210-2, then the power agent component 215-2 will determine, based on information stored by the power planning component 205, that User A has consumed all of his or her allocated power, and will prevent User A from logging in. In embodiments, the power agent component 215 may also enforce power consumption rules that permit a user to access particular applications for certain amounts of time. For example, the power agent component 215 may cause user device 210 to quit an application once a user has reached their allotted time for the application. Further, power agent component 215 may prevent the user from accessing this application again.

Figure 6:
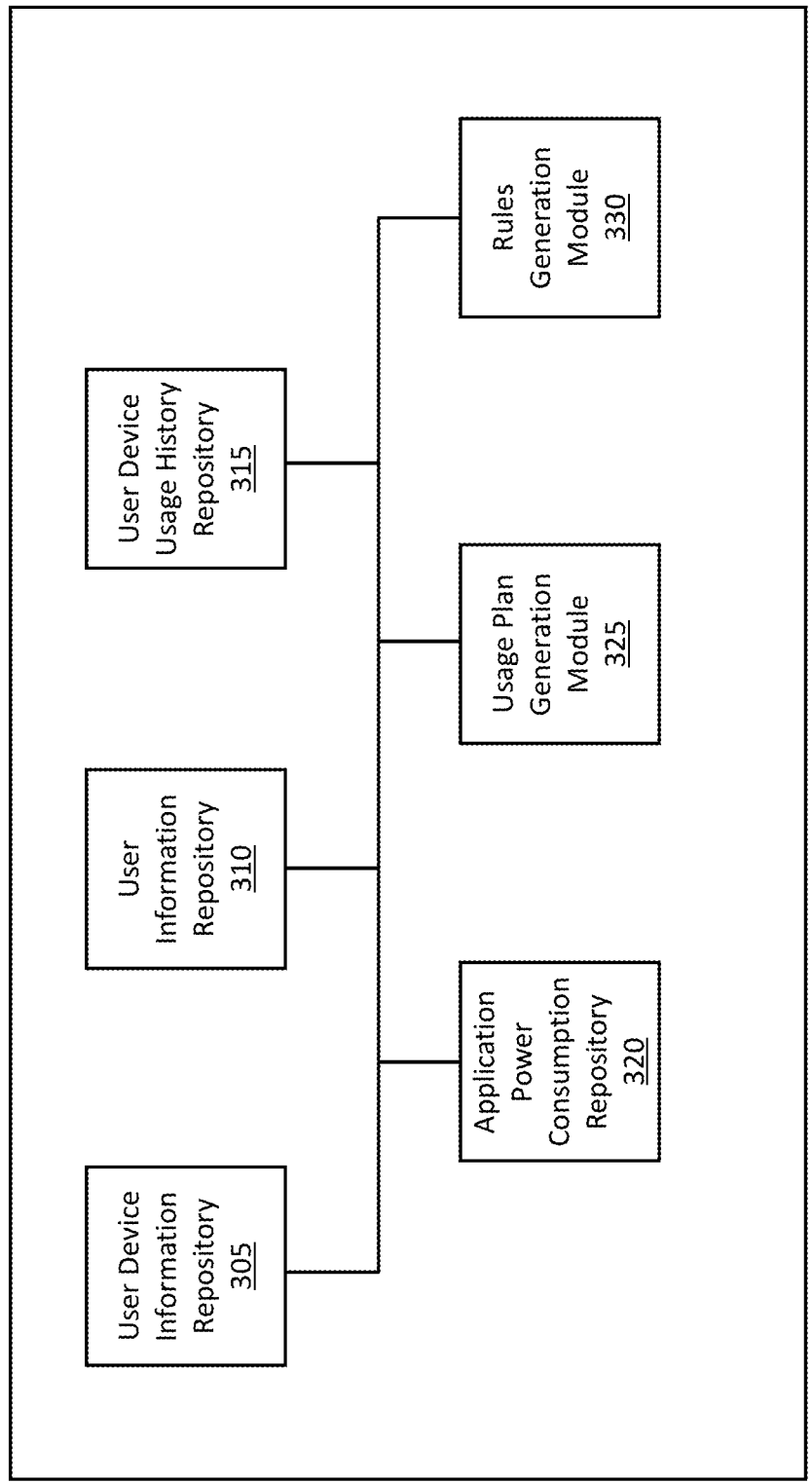
FIG. 6 shows a block diagram of example components of a power planning component in accordance with aspects of the present invention.

FIG. 6 shows a block diagram of example components of a power planning component 205 in accordance with aspects of the present invention. As shown in FIG. 6, the power planning component 205 may include a user device information repository 305, a user information repository 310, a user device usage history repository 315, an application power consumption repository 320, a usage plan generation module 325, and a rules generation module 330. In embodiments, the power planning component 205 may include additional or fewer components than those shown in FIG. 6. In embodiments, separate components may be integrated into a single computing component or module. Additionally, or alternatively, a single component may be implemented as multiple computing components or modules.

The user device information repository 305 may store information regarding user devices 210 associated with a particular group of users or family. For example, the user device information repository 305 may receive registration information that registers particular user devices 210 to a particular group. The user device information repository 305 may store information identifying a power capacity for each user device 210 when each user device 210 is fully charged.

The user information repository 310 may store information regarding users in a particular group or family. For example, the user information repository 310 may receive registration information that registers particular users with a particular group. In embodiments, the user information repository 310 may store user information such as names or images associated with different users. In embodiments, the user information repository 310 may also store information identifying an amount of power that each user has currently used in their respective power allotments. The power agent component 215 may use this information to determine when a user has reached their allotted power, and may prevent the user from continuing to use a user device 210 once the user has reached their allotted power.

The user device usage history repository 315 may store information regarding usage history of user devices 210 associated with particular users. For example, the user device usage history repository 315 may store information identifying an average duration per day that a particular user uses a particular application. As described herein, information stored by the user device usage history repository 315 may be used to generate a suggested usage plan.

The application power consumption repository 320 may store information identifying power consumption rates for different applications. For example, a video viewing application typically consumes power at a higher rate than an e-mail application. As described herein, information stored by the application power consumption repository 320 may be used to estimate a total amount of power that would be used for a usage plan.

The usage plan generation module 325 may receive user inputs corresponding to a desired usage plan. For example, the usage plan generation module 325 may receive a desired usage plan indicating how different users wish to use a group of user devices 210. In embodiments, the desired usage plan may indicate a duration that individual users wish to user particular applications on the user devices 210.

The usage plan generation module 325 may determine an amount of power that would be consumed for the desired usage plan, e.g., by multiplying the durations that individual users wish to use particular applications by rate at which the particular applications consume power. If the amount of power that would be consumed for the desired usage plan exceeds the amount of total power available to the user devices 210, e.g., as determined based on information stored by the user device information repository 305, the usage plan generation module 325 may indicate that the desired usage plan is not possible. Usage plan generation module 325 may then suggest an alternative usage plan. The alternative usage plan may attempt to closely match the desired usage plan, and may be further based on user device usage history, e.g., information stored by the user device usage history repository 315.

In embodiments, the usage plan generation module 325 may suggest an alternative usage plan if the estimated power consumed for the desired usage is less than the total amount of available power across the user devices 210. For example, if the desired usage plan indicates that a user wishes to use an e-mail application for one hour, but enough power is available for the user to use the e-mail application for 1.5 hours, then the usage plan generation module 325 may suggest an alternative usage plan of 1.5 hours for the e-mail application. The usage plan generation module 325 may output to a rules generation module 330 a usage plan that identifies how power across the user devices 210 should be allocated to the users.

In embodiments, the usage plan may identify a percentage of total power to allocate to each user. Additionally, or alternatively, the usage plan may identify a maximum duration that each user may use particular applications. In embodiments, the usage plan may be visually displayed so that users are made aware as to the amount of power they are allocated, and the amount of time that the users may be permitted to use particular applications.

The rules generation module 330 may receive a usage plan from the usage plan generation module 325 and may generate rules corresponding to the usage plan. For example, the rules generation module 330 may generate rules that permit a particular user to consume less than a particular amount of power, or permit the particular user to use particular applications for less than a particular duration of time. The rules generation module 330 may output the rules to the power agent component 215, and the power agent component 215 may enforce the rules to prevent users from exceeding their allotted power. As a result, the individuals in the group of users are able to use the user devices 210 in accordance with a usage plan and without the need to recharge user devices 210.

Figure 7A:
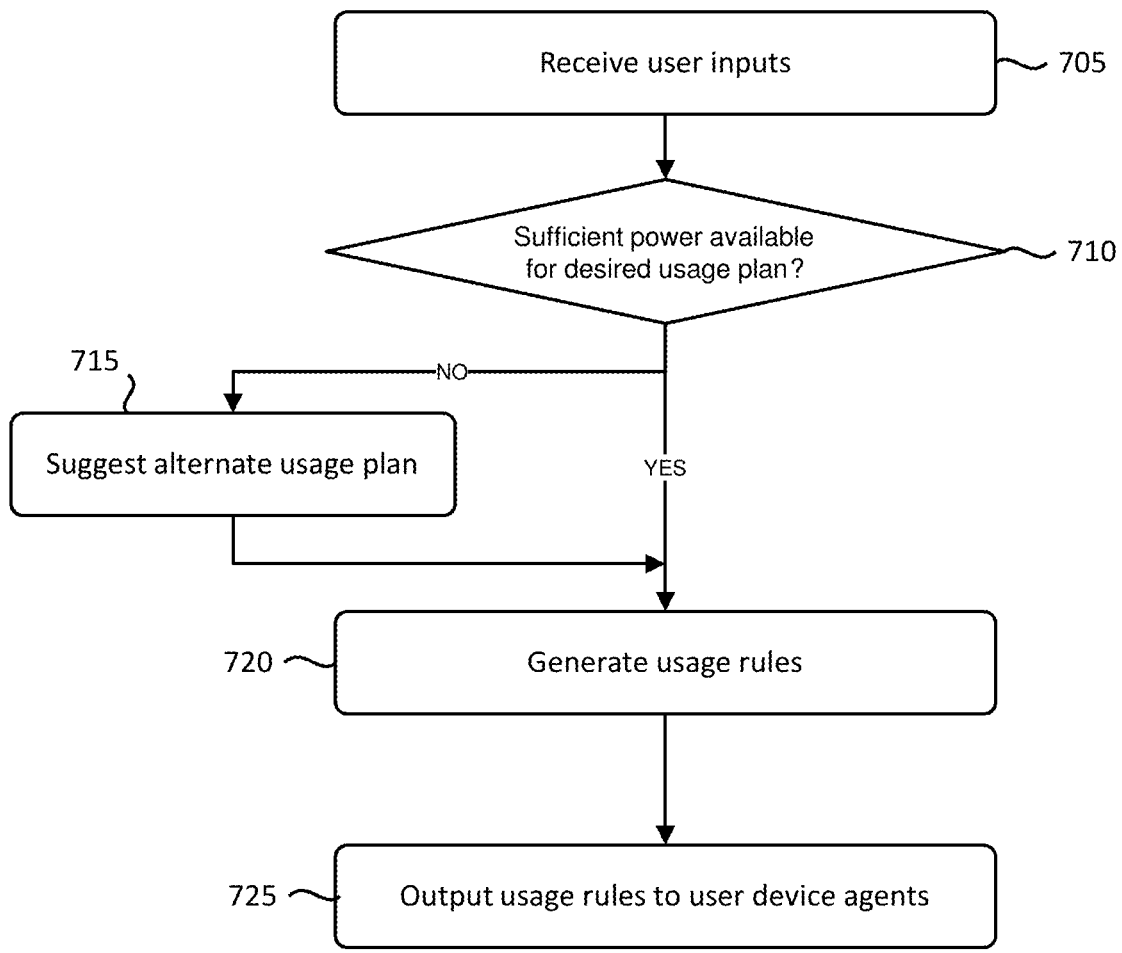
FIGS. 7A-7C show example flowcharts for generating a usage plan and generating corresponding usage rules that implement the usage plan, in accordance with aspects of the present invention.
Figure 7B:
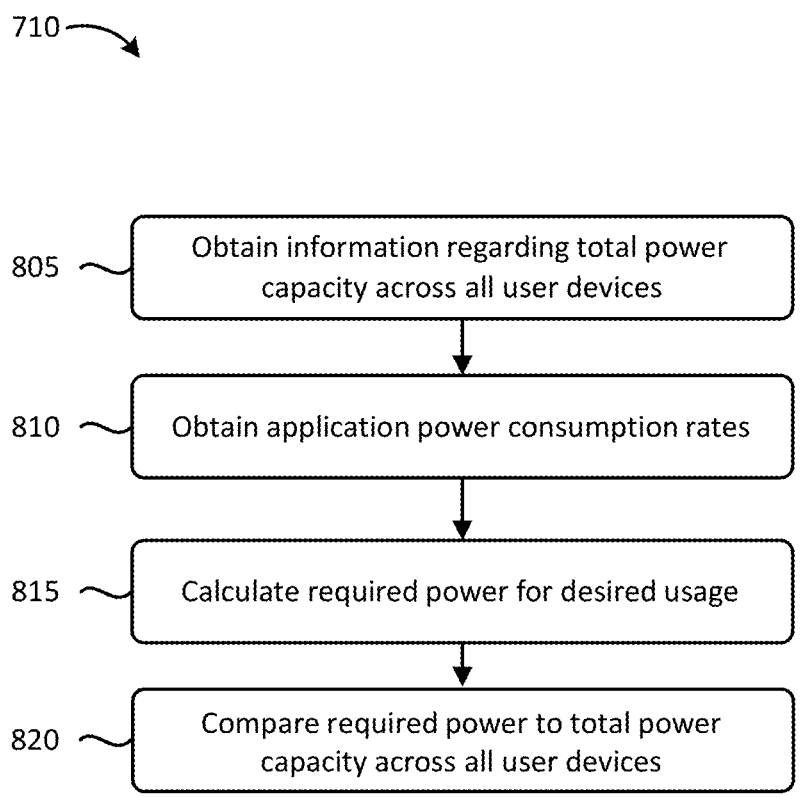
Figure 7C:
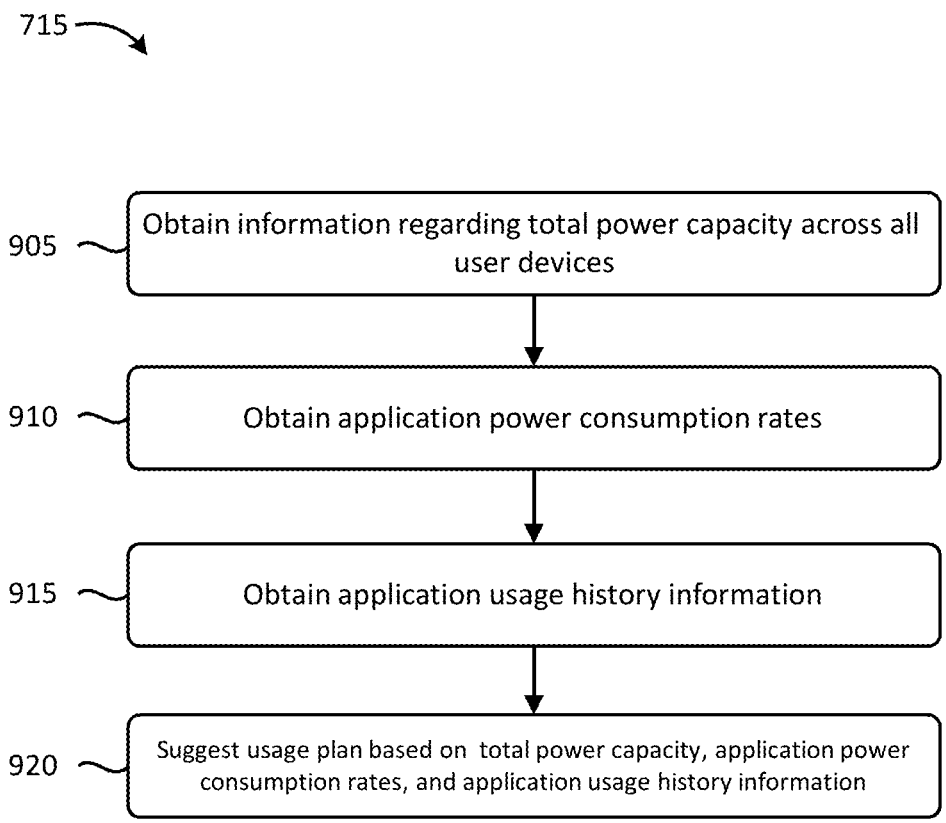

FIGS. 7A-7C show example flowcharts for generating a usage plan and generating corresponding usage rules that implement the usage plan, in accordance with aspects of the present invention. The steps of FIGS. 7A-7C may be implemented in the environment of FIG. 1, for example. As noted above, the flowchart(s) illustrate the architecture, functionality, and operation of possible implementations of systems, methods, and computer program products according to various embodiments of the present invention.

The flowcharts in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

As shown in FIG. 7A, user inputs are received at step 705. For example, the user inputs are received via a user interface of an application or web portal associated with the power planning component 205. As an illustrative example, a user may provide login credentials that identify the user's group and the user devices 210 registered to the user's group. The user may then provide user inputs indicating a desired usage plan, e.g., how the users in the group wish to use their user devices 210 without the need to recharge the user devices 210. By way of example, the user inputs may indicate that User A wishes to use an e-mail application for one hour, a video viewing application for 30 minutes, a social media application for two hours, a texting application for 45 minutes, and a voice calling application for one hour. Further, the user inputs may indicate that User B wishes to use an e-mail application for two hours, a camera application for 20 minutes, a social media application for three hours, a texting application for 35 minutes, and a video calling application for 30 minutes.

Based on receiving the user inputs, a determination is made as to whether sufficient power is available across all the user devices 210 registered to the group for the desired usage plan (step 710). As described herein, the determination is made by obtaining information regarding the total power capacity across all the user devices 210 registered to the group. Further, application power consumption rates may be obtained, and the required power needed for the desired usage is calculated.

If insufficient power is available for the desired usage plan, e.g., if the required power needed for the desired usage power is greater than the available power, (step 710-NO), an alternate usage plan is suggested (step 715). For example, the alternate usage plan would consume up to the available power across the user devices 210 without the need to recharge the user devices 210. Additional details regarding the determination of an alternate usage plan is described herein with respect to FIG. 7C.

In some embodiments, step 715 may be omitted, for example, if sufficient power is available to implement a desired usage plan, e.g., the desired usage plan received at step 705 (step 710—YES). In some embodiments, step 715 may be performed even if sufficient power is available to implement a desired usage plan. For example, if one hour of usage for an e-mail application is desired, but enough power is available for 1.5 hours of usage for the e-mail application, an alternate usage plan may be suggested to increase the duration of usage for the e-mail application from one hour to 1.5 hours.

In some embodiments, step 715 may be omitted even if sufficient power is not available to implement a desired usage plan. For example, an error message may be provided indicating that the desired usage plan is not possible, and that the desired usage plan should be adjusted. The user may then adjust the desired usage plan until the usage plan is possible (e.g., the amount of power for the usage plan is less than the available amount of power across the user devices 210).

At step 720, usage rules may be generated. The usage rules may correspond to the usage plan. As described herein, the usage rules may prevent users from exceeding their permitted power allotments so that each user may use the user devices 210 in accordance with the usage plan without the need to recharge the user devices 210.

At step 725, the usage rules may be output to the power agent components 215 of each user device 210 associated with the group. In embodiments, the usage rules may be received by the power agent components 215 when the user devices 210 communicate with the power planning component 205.

FIG. 7B shows an example process for determining whether sufficient power is available across all the user devices 210 registered to the group, e.g., step 710 of FIG. 7A. At step 805, information regarding the total power capacity across all the user devices 210 registered to the group is obtained, e.g., from user device information repository 305. At step 810, application power consumption rates may be obtained, e.g., from the application power consumption repository 320. At step 815, the required power needed for the desired usage is calculated. For example, to calculate the required power needed for the desired usage, the durations that individual users wish to use particular applications are multiplied by the rate at which the particular applications consume power.

At step 820, the required power is compared to the total power capacity across all the user devices 210. If the required power is greater than the total power capacity of the user devices 210 registered to the group, a determination is made that insufficient power is available for the desired usage plan. If the required power is not greater than the total power capacity of the user devices 210 registered to the group, a determination is made that sufficient power is available for the desired usage plan.

FIG. 7C shows an example process for suggesting an alternate usage plan, e.g., step 715 of FIG. 7A. At step 905, information regarding the total power capacity across all the user devices 210 registered to the group is obtained, e.g., from user device information repository 305. At step 910, application power consumption rates may be obtained, e.g., from the application power consumption repository 320. At step 915, application usage history information may be obtained, e.g., from the user device usage history repository 315.

At step 920, a usage plan may be suggested based on the total power capacity across all user devices 210, application power consumption rates, and application usage history information. Further, the usage plan may be suggested based on the desired usage plan previously inputted. The suggested usage plan may attempt to closely match the desired usage plan, but may reduce the amount of time spent on certain applications so that the power consumed across user devices 210 does not exceed the total power capacity. The suggested usage plan may also take into consideration the application usage history so that power can be allocated such that applications that have been historically used more may be used for a longer duration than applications that have been historically used less.

The suggested usage plan may divide up the power across the users in the group so that the users can use the user devices 210 in a manner that does not exceed the available power across the user devices 210. As an example, the suggested usage plan may indicate that User A should be allocated 40% of the total available power, User B should be allocated 35% of the total available power, User C should be allocated 15% of the total available power, and User D should be allocated 10% of the total available power. Additionally, or alternatively, the suggested usage plan may indicate a duration of time that each user may use particular applications so that the power usage is not exceeded.

Figure 8:
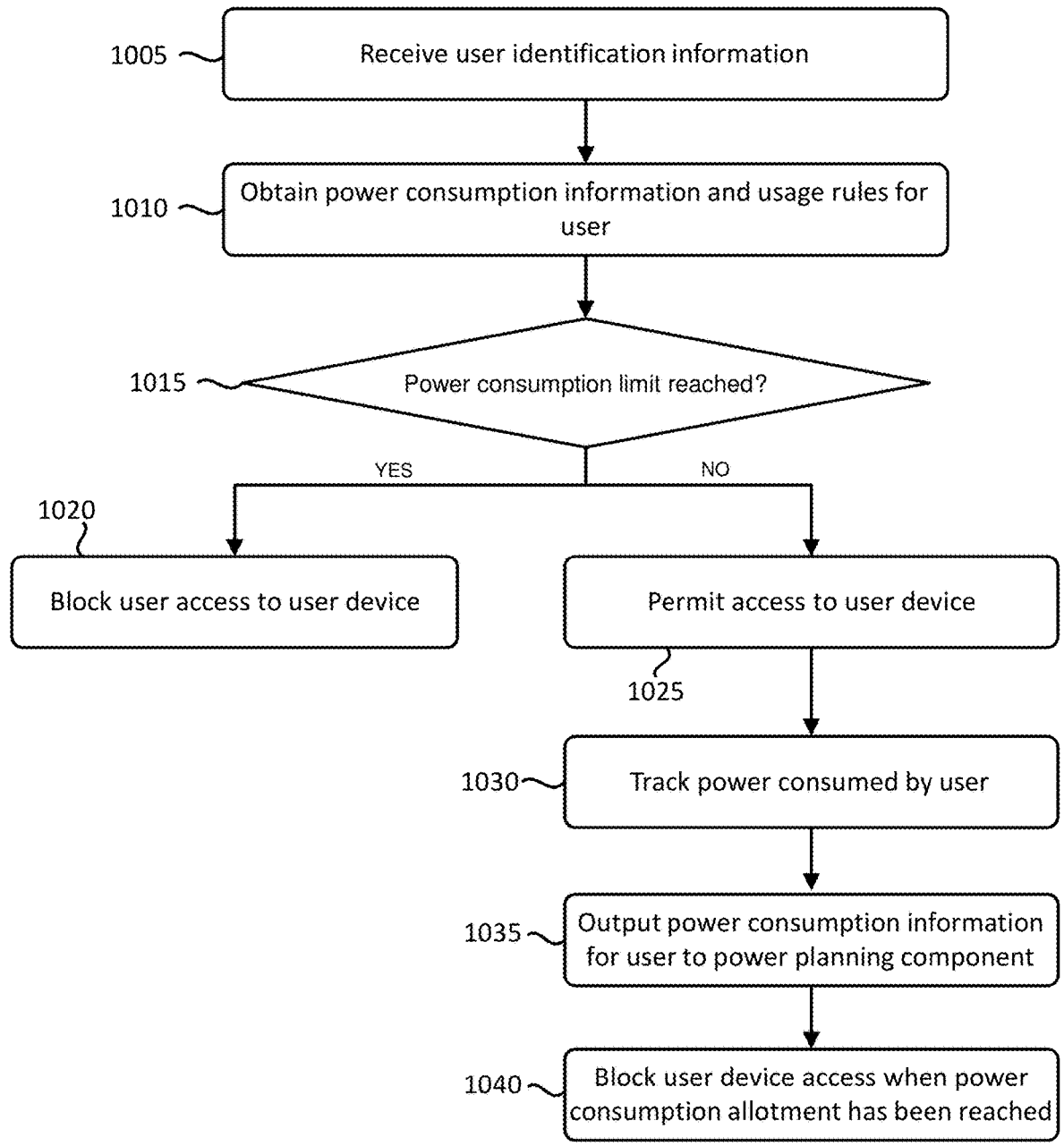
FIG. 8 shows an example flowchart for enforcing usage rules to implement a usage plan in accordance with aspects of the present invention.

FIG. 8 shows an example flowchart for enforcing usage rules to implement a usage plan, in accordance with aspects of the present invention. The steps of FIG. 8 may be implemented in the environment of FIG. 1, for example. As noted above, the flowchart(s) illustrate the architecture, functionality, and operation of possible implementations of systems, methods, and computer program products according to various embodiments of the present invention. At step 1005, user identification information is received. For example, a user of a user device 210 may provide the user identification information when logging in to the user device 210. In some embodiments, the user identification information may include a username and password, biometrics information, and/or other information that identifies the user.

At step 1010, power consumption information and usage rules for the user is obtained, e.g., from user information repository 310. The power consumption information identifies an amount of power that the user has consumed since the user devices 210 were last recharged. In embodiments, the power consumption information may indicate a number of units, e.g., milliamp-hours, or a percentage remaining in the user's power allotment. The power consumption information may also identify a duration of time that the user has spent using particular applications. The usage rules may identify an amount of power that the user is permitted to consume, as well as the amount of time that the user is permitted to use the particular applications, e.g., so that the user does not exceed their power allotment.

At step 1015, a determination is made as to whether the user's power consumption limit has been reached. For example, the determination may be made by comparing the power consumption information with the limits identified in the usage rules for the user. If, for example, the user's power consumption limit has been reached (block 1015—YES), user access to the user device 210 is blocked. For example, the user may be prevented from logging in when the user's power allotment has been reached. In embodiments, the user may be permitted to access certain applications on the user device 210, but may be prevented from accessing other applications on user device 210. For example, the user may be permitted to access applications in which the user's time limit has not been reached, but may be blocked from accessing applications in which the user's time limit has been reached.

If, on the other hand, the user's power consumption limit has not been reached (block 1015-NO), access to the user device 210 is permitted (step 1025). At step 1030, the amount of power consumed by the user is tracked. Additionally, or alternatively, the duration of time that the user spends on particular applications is also tracked.

At step 1035, the power consumption information for the user is outputted to the power planning component 205. For example, as the user consumes power on the user device 210, information identifying an amount of power consumed is periodically or intermittently provided to the power planning component 205. Additionally, or alternatively, the duration of time that the user spends on particular applications may also be provided to the power planning component 205. The user's power consumption and/or application usage duration information may be shared across other user devices 210 associated with the user's group so that the user does not exceed their total power allotment when logging in to other user devices 210.

At step 1040, the user's access to the user device 210 is blocked once the user's power consumption allotment has been reached. In embodiments, a user, e.g., User A, may log out of the user device 210 once the user is finished using the user device 210. When another user, e.g., User B, wishes to use the user device 210, the User B may then log in to the user device 210 so that User B's power consumption can be tracked, and so that power consumption rules for User B can be enforced.

FIG. 9 shows an example user interface associated with a the power planning component 205 in accordance with aspects of the present invention. As shown in FIG. 9, an administrative device 1105 may access the power planning component 205, e.g., via a web portal. For example, the power planning component 205 may be implemented as a cloud server that is accessible via an external network. Alternatively, the power planning component 205 may be implemented as an application for a particular administrative user device 210. In embodiments, user credentials may be provided to the power planning component 205. Based on receiving the user credentials, the power planning component 205 may identify a group account having a list of registered users and user devices 210.

As shown in FIG. 9, the user interface may display information for total power availability across the user devices 210 registered to the group. The user interface may also display user information, and may include fields that the user may use to enter a desired usage plan. For example, the user may enter a desired allocation percentage for each user. Additionally, or alternatively, the user may enter desired durations of time for each user to use particular applications. In embodiments, the user may enter either a desired allocation percentage for each user, desired durations of times for particular applications, or both. Once the user has entered the desired usage plan, the user may submit the desired usage plan. As described herein, the power planning component 205 may determine whether the desired usage plan is possible, and may further suggest an updated usage plan. In embodiments, the user interface of FIG. 9 may also represent a suggested usage plan provided to the user by the power planning component 205.

Figure 10:
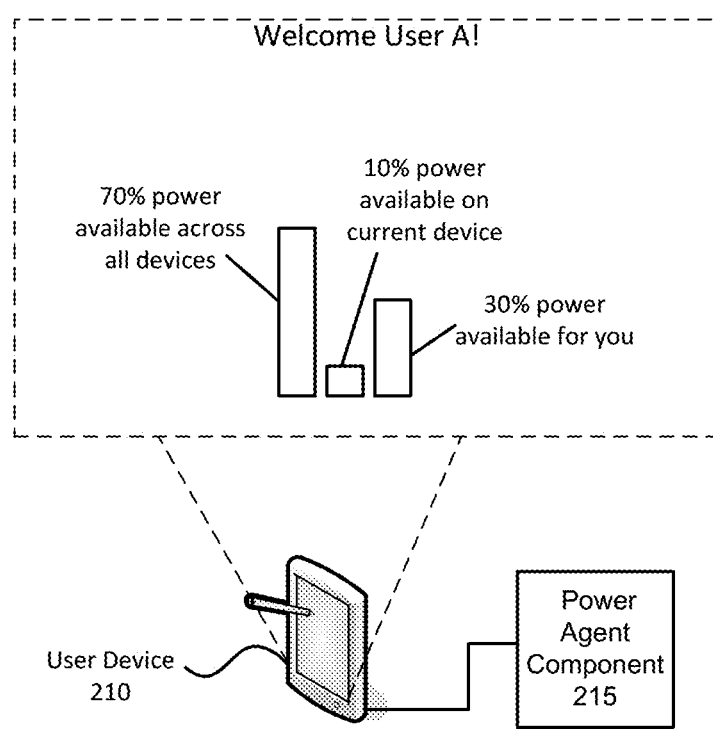
FIG. 10 shows an example user interface for a user device when a user logs into the user device in accordance with aspects of the present invention.

FIG. 10 shows an example user interface for a user device 210 when a user logs into the user device 210 in accordance with aspects of the present invention. In FIG. 10, assume that User A logs in to the user device 210. Given this assumption, the user device 210 may display an amount of power remaining across all the user devices 210 registered to the group of User A. Further, user device 210 may display an amount of remaining power available on the particular user device 210 in which User A is using. Also, user device 210 may display an amount of power remaining in the user's allotment. In the illustrative example of FIG. 10, the user device 210 may display that 70% of total power is remaining across all of the user devices 210, 10% of power is remaining on the particular user device 210, and that 30% of power remaining in the user's allotment. In embodiments, the power agent component 215 may obtain information identifying the amount of power remaining in all of the user devices 210, and the amount of power remaining in the user's allotment from the power planning component 205. In embodiments, the information regarding the amount of remaining power may be displayed in the form of percentages. Additionally, or alternatively, the amount of remaining power may be displayed in the form of power units, e.g., milliamp hours, and/or an estimated amount of usage time remaining.

Figure 11A:
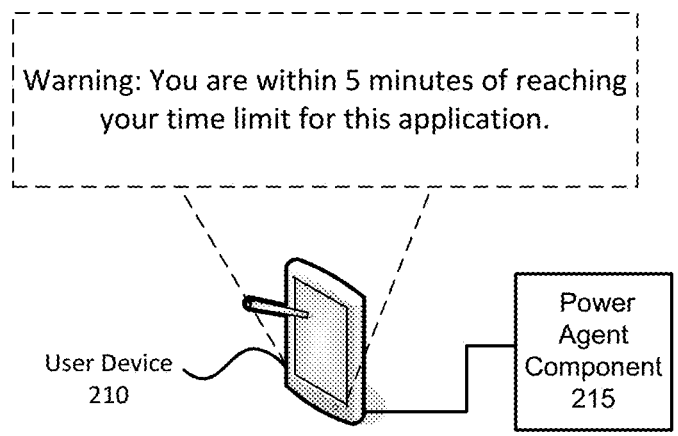
FIGS. 11A-11C show example alert messages, in accordance with aspects of the present invention.
Figure 11B:
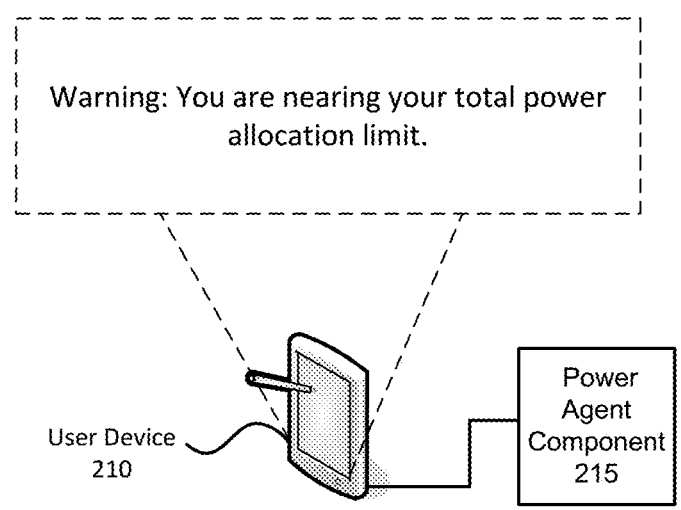
Figure 11C:
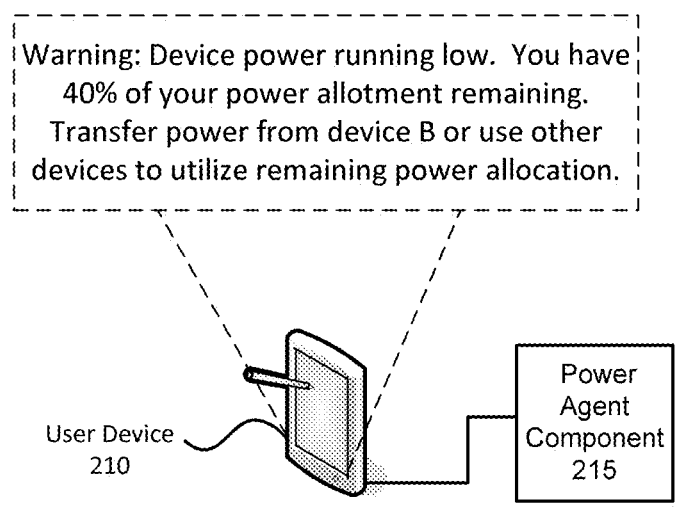

FIGS. 11A-11C show example alert messages, in accordance with aspects of the present invention. As shown in FIG. 11A, a user device 210 may display an alert that the user currently using the user device 210 is within 5 minutes of reaching their time limit for a particular application. For example, the power agent component 215 may compare the amount of time that the user has spent using the particular application with the amount of time that the user is permitted to use the particular application, e.g., to prevent the user from consuming greater than the user's power allotment.

As shown in FIG. 11B, user device 210 may display an alert that the user currently using the user device 210 is nearing the user's total power allocation limit. For example, the power agent component 215 may compare the total amount of power consumed by the user with the amount of power that the user is permitted to consume.

As shown in FIG. 11C, the user device 210 may display an alert that the amount of power remaining on the user device 210 is running low, and that the user still has additional power remaining in their allotment. The user device 210 may also indicate that the user should either transfer power from a different user device 210, or use a different user device so that the user can utilize their remaining power in their allotment. For example, the amount of power remaining on other user devices 210 may be shared between the power agent components 215 between the user devices 210 registered to the user's group. Based on the amount of power remaining on other user devices 210, a suggestion can be made as to which user device 210 from which power should be transferred. In embodiments, power may be transferred between user devices via a charging cable, wireless charging techniques, and/or other known charging techniques.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method for dividing power across user devices 210, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a CPU, a computer readable memory and a computer readable storage medium associated with a user device;
    program instructions to receive a desired usage plan for a plurality of user devices associated with a group of users;
    program instructions to determine whether an amount of power available across the plurality of user devices is sufficient to implement the desired usage plan;
    program instructions to generate, based on the amount of power available across the plurality of user devices for the desired usage rules, usage rules that allocate the usage of the plurality of the user devices by each user in the group of users; and
    program instructions to output to the plurality of user devices, the usage rules to cause the plurality of user devices to limit the usage of the plurality of user devices by each user in the group of users based on the allocation,
    wherein the program instructions are stored on the computer readable storage medium for execution by the CPU via the computer readable memory.

2. The system of claim 1, further comprising program instructions to determine an alternate usage plan based on the amount of power available across the plurality of user devices being insufficient to implement the desired usage plan.

3. The system of claim 2, further comprising program instructions to identify an amount of power that each user in the group of users is permitted to consume across the plurality of user devices via the desired usage plan or the alternate usage plan.

4. The system of claim 2, further comprising program instructions to identify a duration of time that applications are used on the plurality of user devices via the desired usage plan or the alternate usage plan.

5. The system of claim 2, wherein the program instructions to determine the alternate usage plan are based on application usage history of applications used by the group of users on the plurality of user devices.

6. The system of claim 1, wherein the program instructions to determine that the amount of power available across the plurality of user devices is sufficient to implement the desired usage plan comprise:
    program instructions to obtain information regarding a total power capacity of the plurality of user devices;
    program instructions to obtain information regarding power consumption rates for applications associated with the plurality of user devices; and
    program instructions to calculate the amount of power required to implement the desired usage plan based on the information regarding power consumption rates for the applications.

7. The system of claim 1, further comprising program instructions to identify a quantity of units that each user is permitted to consume across the plurality of user devices via one or more of the plurality of user devices and via the usage rules.

8. The system of claim 1, further comprising program instructions to identify a duration of time that each user is permitted to use a particular application via one or more of the plurality of user devices and via the usage rules.

9. The system of claim 1, wherein the desired usage plan corresponds to usage of the plurality of user devices by the group of users without recharging the plurality of user devices using a power receptacle in a facility.

10. The system of claim 1, further comprising program instructions to block access to the user device when the amount of power that the user has consumed across a plurality of user devices is greater than the power consumption limit.

11. A computer program product comprising a computer readable storage medium having program instructions embodied therewith, the program instructions executable by a computing device to cause the computing device to:
   receive user information identifying a user that is part of a group of users;
   obtain a power consumption limit information associated with the user information;
   obtain power consumption information associated with the user information, wherein the power consumption information identifies an amount of power that the user has consumed across a plurality of user devices associated with the user;
   determine, based on the power consumption information, whether the amount of power that the user has consumed across a plurality of user devices is less than the power consumption limit;
   block access to the user device when the amount of power that the user has consumed across a plurality of user devices is greater than the power consumption limit; and
   permit access to the user device when the amount of power that the user has consumed across a plurality of user devices is less than the power consumption limit.

12. The computer program product of claim 11, wherein the program instructions to block access to the user device comprise program instructions to cause the user device to lock one or more usage functions of the user device.

13. The computer program product of claim 11, further comprising program instructions to:
   track an amount of power consumed by the user on the user device after permitting access to the user device; and
   output information identifying the amount of power consumed by the user on the user device as the user uses the user device.

14. The computer program product of claim 13, further comprising program instructions to block the user's access to the user device when the power consumption limit has been reached.

15. A method comprising:
   receiving, via a computer device, a desired usage plan for the plurality of user devices;
   determining, via the computer device, whether an amount of power available across the plurality of user devices is sufficient to implement the desired usage plan;
   generating, via the computer device, based on the desired usage plan, usage rules that limit the usage of the plurality of user devices by each user in the group of users; and
   outputting, via the computer device, to the plurality of user devices, the usage rules to cause the plurality of user devices to limit the usage of the plurality of user devices by each user in the group of users.

16. The method of claim 15, further comprising determining, via the computer device, an alternate usage plan based on determining that the amount of power available across the plurality of user devices is not sufficient to implement the desired usage plan.

17. The method of claim 15, wherein the desired usage plan or the alternate usage plan identify a duration of time that applications can be used on the plurality of user devices.

* * * * *